(12) United States Patent
Higashino et al.

(10) Patent No.: US 10,374,243 B2
(45) Date of Patent: Aug. 6, 2019

(54) POROUS CURRENT COLLECTOR AND FUEL CELL

(71) Applicant: SUMITOMO ELECTRIC INDUSTRIES, LTD., Osaka-shi, Osaka (JP)

(72) Inventors: Takahiro Higashino, Hyogo (JP);
Masatoshi Majima, Hyogo (JP);
Hiromasa Tawarayama, Hyogo (JP);
Naho Mizuhara, Hyogo (JP); Kazuki Okuno, Hyogo (JP); Chihiro Hiraiwa, Hyogo (JP); Yohei Noda, Hyogo (JP);
Masahiro Kato, Hyogo (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 255 days.

(21) Appl. No.: 15/127,797

(22) PCT Filed: Feb. 23, 2015

(86) PCT No.: PCT/JP2015/054978
§ 371 (c)(1),
(2) Date: Sep. 21, 2016

(87) PCT Pub. No.: WO2015/151645
PCT Pub. Date: Oct. 8, 2015

(65) Prior Publication Data
US 2017/0098841 A1  Apr. 6, 2017

(30) Foreign Application Priority Data

Mar. 31, 2014  (JP) .................................. 2014-072559

(51) Int. Cl.
*H01M 8/0637* (2016.01)
*H01M 4/90* (2006.01)
(Continued)

(52) U.S. Cl.
CPC ....... *H01M 8/0637* (2013.01); *H01M 4/9058* (2013.01); *H01M 8/0232* (2013.01);
(Continued)

(58) Field of Classification Search
CPC ............ H01M 8/0637; H01M 8/0232; H01M 8/0245; H01M 2008/1293
See application file for complete search history.

(56) References Cited

U.S. PATENT DOCUMENTS

2004/0028994 A1*  2/2004  Akikusa ................... C22C 5/08
                                                        429/480
2005/0155490 A1*  7/2005  Barker ................ H01M 8/0206
                                                           96/15
(Continued)

FOREIGN PATENT DOCUMENTS

CN  102460793 A  5/2012
EP  1 306 920 A2  5/2003
(Continued)

OTHER PUBLICATIONS

JP2012132083 MT (Year: 2012).*
2016511445, Decision_to_Grant_a_Patent_(Translated),dated Sep. 11, 2018 (Year: 2018).*
201580018017, Notification_to_Grant_Pate . . . ntion(PCT)_(Translated),dated Oct. 25, 2018 (Year: 2018).*

*Primary Examiner* — Alexander Usyatinsky
(74) *Attorney, Agent, or Firm* — Drinker Biddle & Reath LLP

(57) ABSTRACT

Provided is a porous current collector which is used for a fuel electrode and has a high gas reforming function and high durability. A porous current collector 9 is provided adjacent to a fuel electrode 4 of a fuel cell 101 that includes a solid electrolyte layer 2, the fuel electrode 4 disposed on one side of the solid electrolyte layer, and an air electrode 3 disposed on the other side. The porous current collector includes a porous metal body 1 and a first catalyst 20. The porous metal body has an alloy layer 12*a* at least on a surface
(Continued)

thereof, the alloy layer containing nickel (Ni) and tin (Sn). The first catalyst, which is in the form of particles, is supported on a surface of the alloy layer, the surface facing pores of the porous metal body, and is capable of processing a carbon component contained in a fuel gas that flows inside the pores.

8 Claims, 5 Drawing Sheets

(51) Int. Cl.
*H01M 8/0232* (2016.01)
*H01M 8/0245* (2016.01)
*H01M 8/124* (2016.01)

(52) U.S. Cl.
CPC .. *H01M 8/0245* (2013.01); *H01M 2008/1293* (2013.01); *Y02E 60/566* (2013.01)

(56) References Cited

U.S. PATENT DOCUMENTS

| | | | | |
|---|---|---|---|---|
| 2009/0023050 | A1* | 1/2009 | Finnerty | H01M 4/8885 429/411 |
| 2012/0121999 | A1* | 5/2012 | Laurencin | H01M 4/861 429/423 |
| 2013/0108947 | A1* | 5/2013 | Okuno | H01M 4/86 429/522 |

FOREIGN PATENT DOCUMENTS

| | | |
|---|---|---|
| JP | 4432384 B2 | 3/2010 |
| JP | 2012-132083 A | 7/2012 |
| JP | 2012-192350 A | 10/2012 |
| JP | 2013-093271 A | 5/2013 |

* cited by examiner

POROUS CURRENT COLLECTOR AND FUEL CELL

TECHNICAL FIELD

The present invention relates to a porous current collector and a fuel cell. More particularly, the invention relates to a porous current collector which is used for a fuel electrode and has a gas reforming function and a fuel cell including the same.

BACKGROUND ART

Among fuel cells, a solid oxide fuel cell (hereinafter referred to as "SOFC") includes a solid electrolyte layer composed of a solid oxide and electrode layers disposed so as to sandwich the solid electrolyte layer.

In the SOFC, oxygen (air) is fed to an air electrode, and a fuel ($H_2$, $CH_4$, or the like) is fed to a fuel electrode. Each of the air electrode and the fuel electrode is porous so that the gas fed thereto can reach the interface with the solid electrolyte layer.

In the case where a hydrocarbon-containing gas such as natural gas (methane gas) is used as a fuel gas, it is necessary that the gas be reformed as a fuel gas containing hydrogen as a main component and that the reformed gas be allowed to act on the solid electrolyte. A steam reforming method is often used as a technique for reforming the fuel gas.

For example, when methane gas is used as the fuel gas, the methane gas is mixed with water vapor, and the mixture is heated to be decomposed into hydrogen and carbon monoxide, which is further reacted with water vapor to be decomposed into hydrogen and carbon dioxide. In many cases, a reformer which is used to perform reforming is installed outside a fuel cell, and the reformed fuel gas is fed to the fuel cell. When a reformer is installed outside a fuel cell, the scale of the apparatus increases and the apparatus becomes complicated, which is a problem. Accordingly, in some cases, an internal reforming method in which a fuel is reformed in a fuel electrode of a fuel cell may be used.

In the internal reforming method, part of the heat generated in the fuel cell can be used as a heat source for performing the steam reforming method and high-temperature waste heat can be recovered and used, and therefore, high energy efficiency is achieved. Accordingly, the internal reforming method has been receiving attention as a method for reforming fuel gas in SOFCs.

CITATION LIST

Patent Literature

PTL 1: Japanese Patent No. 4432384

SUMMARY OF INVENTION

Technical Problem

However, when the internal reforming method is employed, a catalyst in the fuel electrode may be degraded under the influence of $CO_2$ gas generated in the reforming process, $H_2S$ gas contained in the fuel gas, or the like, and carbon generated from the fuel gas may be precipitated on the catalyst in the fuel electrode layer, resulting in an early decrease in the electricity generation performance of the fuel cell, which is a problem.

In order to avoid the problem described above, as described in PTL 1, it is conceivable that a reforming catalyst composed of the same material as that of a fuel electrode is supported on a current collector used in the fuel electrode of a fuel cell.

However, in the case where the current collector on which the reforming catalyst is supported is formed using an inexpensive porous metal body made of nickel, the current collector is likely to be oxidized by water vapor to be fed for reforming or the like. In particular, local current corrosion due to local current is likely to occur in the vicinity of the interface at which the fuel electrode and the current collector are in contact with each other. Furthermore, in an SOFC including a solid electrolyte layer composed of an oxygen ionic conductor, water is produced on the fuel electrode side, and the vicinity of the fuel electrode is subjected to a harsher corrosive environment. When the current collector is corroded, the electrical resistance of the current collector increases, giving rise to problems of decreased electricity generation performance and durability of the fuel cell.

The present invention has been devised to solve the problems described above, and it is an object of the present invention to provide a porous current collector which is used for a fuel electrode and which has a high gas reforming function and high durability.

Solution to Problem

A porous current collector according to an embodiment of the present invention, which is provided adjacent to a fuel electrode of a fuel cell that includes a solid electrolyte layer, the fuel electrode disposed on one side of the solid electrolyte layer, and an air electrode disposed on the other side, includes a porous metal body and a first catalyst. The porous metal body has an alloy layer at least on a surface thereof, the alloy layer containing nickel (Ni) and tin (Sn). The first catalyst is supported on a surface of the alloy layer, the surface facing pores of the porous metal body, and is capable of processing a carbon component contained in a fuel gas that flows inside the pores.

Advantageous Effects of Invention

According to the invention, it is possible to provide a porous current collector having both a high fuel gas reforming function and high durability.

DESCRIPTION OF EMBODIMENTS

General Description of Embodiments

Figure 1:
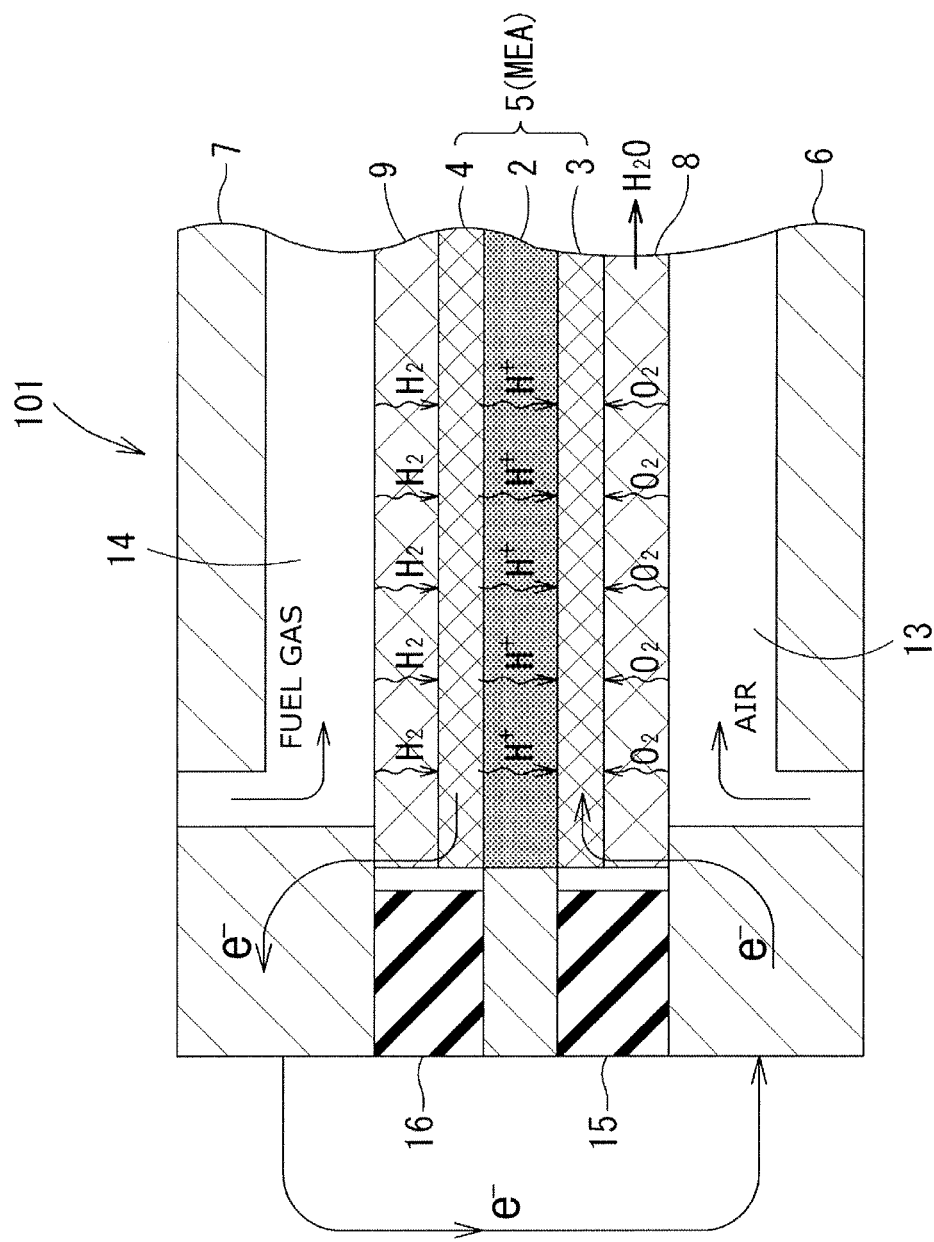
FIG. 1 is a cross-sectional view schematically showing a structure of a fuel cell.

A porous current collector according to an embodiment of the present invention, which is provided adjacent to a fuel electrode of a fuel cell that includes a solid electrolyte layer, the fuel electrode disposed on one side of the solid electrolyte layer, and an air electrode disposed on the other side, includes a porous metal body and a first catalyst. The porous metal body has an alloy layer at least on a surface thereof, the alloy layer containing nickel (Ni) and tin (Sn). The first catalyst is supported on a surface of the alloy layer, the surface facing pores of the porous metal body, and is capable of processing a carbon component contained in a fuel gas that flows inside the pores.

A Ni—Sn alloy is a good electric conductor, and an oxide film $SnO_2$ formed on the surface thereof serves as an oxygen permeation barrier layer to protect an underlying layer and has a function of preventing a surface oxidized layer from growing. Moreover, since the oxide film $SnO_2$ has a certain degree of electrical conductivity, it is possible to secure electrical conductivity as a porous current collector while forming a barrier layer that prevents an oxidized layer from growing. Therefore, even in a high-temperature, oxidizing atmosphere that contains water vapor for reforming fuel gas, the Ni—Sn alloy is allowed to serve as an electric conductor. Furthermore, since growth of an oxidized film is prevented, durability is high, and the cost is low.

The alloy layer containing nickel (Ni) and tin (Sn) is formed at least on the surface of the porous metal body. This prevents corrosion of the inside of the porous metal body, and it is possible to secure electrical conductivity in a corrosive environment for a long period of time. The entirety of the porous metal body may be composed of a nickel-tin alloy. Furthermore, an alloy element other than nickel and tin may be incorporated into the alloy layer. For example, in order to enhance corrosion resistance and the like, a metal such as chromium (Cr) may be incorporated into the alloy layer.

In addition to the Ni component, and the Sn component, less than 10% by mass of a phosphorus component can be added into the alloy layer. In order to add the phosphorus component, an additive containing phosphorus may be added during formation of a Ni—Sn alloy layer. For example, after a Ni layer is formed by electroless nickel plating, by using a hypophosphorous acid-based material as a reducing agent, the phosphorus component can be added. Thereby, electrolytic resistance and corrosion resistance are further improved. As the phosphorus content increases, heat resistance decreases. Therefore, the phosphorus content is preferably set at less than 10%.

The content of tin (Sn) in the alloy layer can be set at 5% to 30% by mass. More preferably, the content of Sn is set at 10% to 25% by mass. When the content of Sn is less than 5% by mass, it is not possible to secure oxidation resistance in a high-temperature, oxidizing atmosphere. On the other hand, when the content of Sn is more than 30% by mass, the content of a brittle alloy layer increases, resulting in a decrease in the compressive strength of the substrate. Accordingly, it is not possible to secure the mechanical strength as a current collector.

As the content of tin in the alloy layer increases, the raw material cost increases. Furthermore, as the content of tin in the alloy layer increases, $Ni_3Sn_2$ which is a hard brittle solid solution is likely to be generated in the alloy layer, and the porous current collector becomes brittle (becomes difficult to be formed). That is, from the viewpoint of the formability (ease of forming) of the porous current collector and the raw material cost, the content of tin is desirably decreased. From the viewpoint of oxidation resistance, the content of tin is desirably increased. Therefore, it is desirable to take these into consideration and select a suitable content of tin for the intended use.

FIGS. 5 to 8 are graphs showing X-ray diffraction (XRD) analysis results of a Ni-3 wt % Sn porous current collector, a Ni-5 wt % Sn porous current collector, a Ni-8 wt % Sn porous current collector, and a Ni-16 wt % Sn porous current collector, respectively. In FIGS. 5 to 8, the horizontal axis indicates the X-ray incident angle 2θ (deg), and the vertical axis indicates the diffraction intensity (cps).

The Ni—Sn porous current collectors used in the XRD analysis shown in FIGS. 5 to 8 are produced by a method for producing a porous metal body 1 which will be described later.

Figure 5:
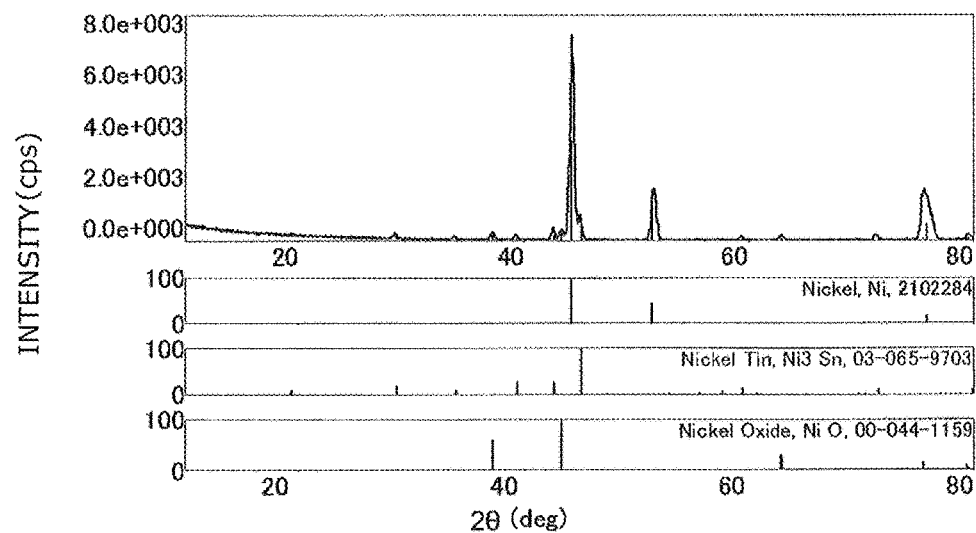
FIG. 5 is a graph showing XRD analysis results of a Ni-3 wt % Sn porous current collector.
Figure 6:
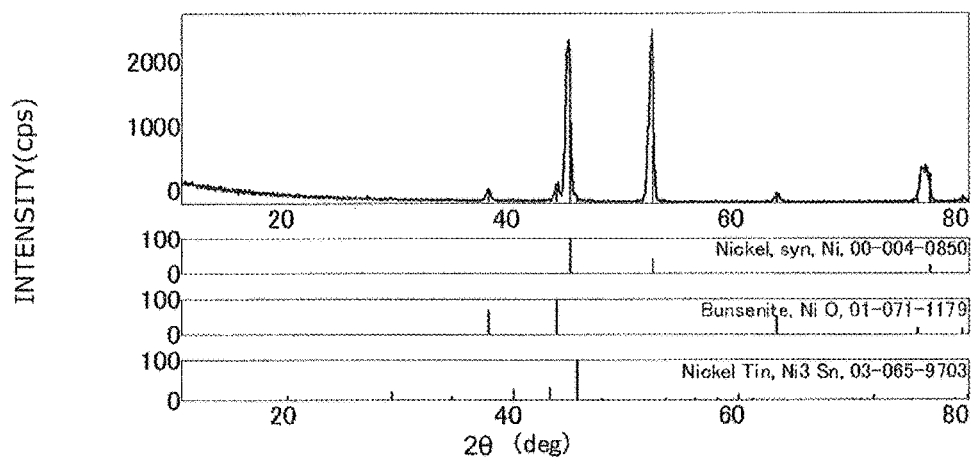
FIG. 6 is a graph showing XRD analysis results of a Ni-5 wt % Sn porous current collector.
Figure 7:
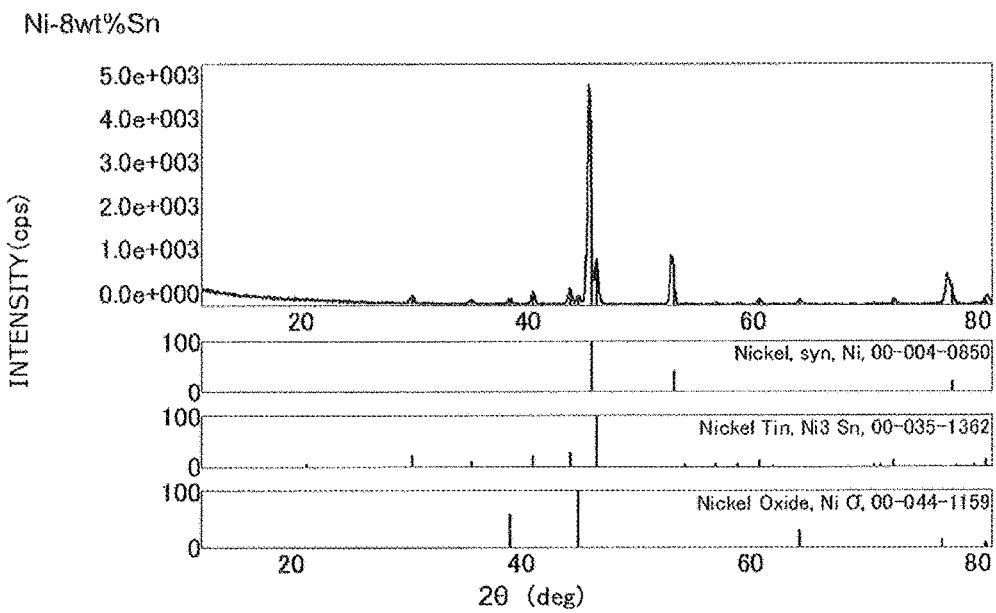
FIG. 7 is a graph showing XRD analysis results of a Ni-8 wt % Sn porous current collector.

As shown in FIGS. 5, 6, and 7, X-ray diffraction peaks of nickel (Ni), $Ni_3Sn$, and NiO are detected, but an X-ray diffraction peak of $Ni_3Sn_2$ is not detected in each of the Ni-3 wt % Sn porous current collector, the Ni-5 wt % Sn porous current collector, and the Ni-8 wt % Sn porous current collector.

Figure 8:
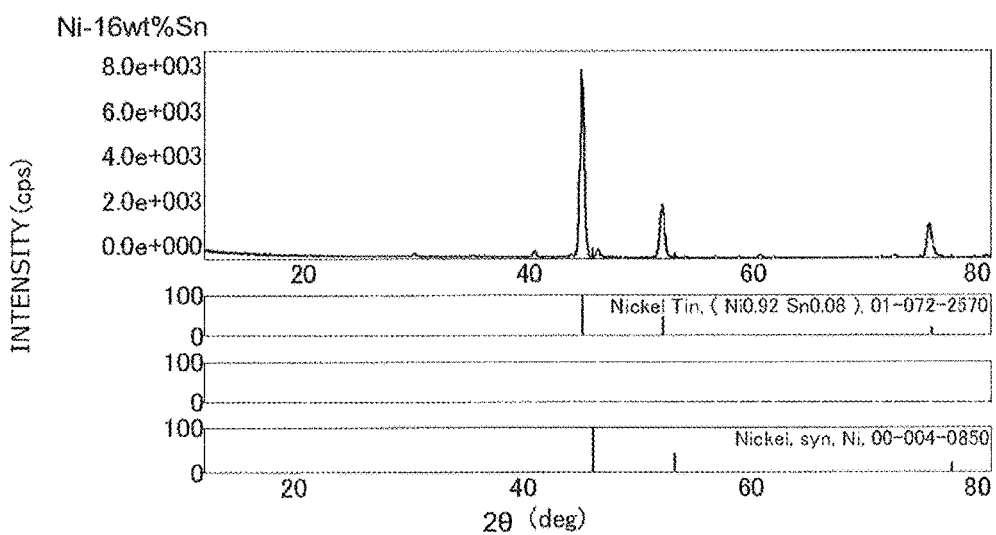
FIG. 8 is a graph showing XRD analysis results of a Ni-16 wt % Sn porous current collector.

As shown in FIG. 8, X-ray diffraction peaks of nickel (Ni) and NiSn are detected, but an X-ray diffraction peak of $Ni_3Sn_2$ is not detected in the Ni-16 wt % Sn porous current collector.

The above results show that when the content of tin in the Ni—Sn porous current collector is 16% by weight or less, $Ni_3Sn_2$ is not present in the alloy layer containing tin in the Ni—Sn porous current collector (even if $Ni_3Sn_2$ is present, the amount thereof is so minute that it cannot be detected by XRD analysis).

Note that, according to the Ni—Sn binary phase diagram, it is believed that when the content of Sn in the Ni—Sn alloy is less than 42% by weight, $Ni_3Sn_2$ is not generated, which is supported by the XRD analysis results shown in FIGS. 5 to 8.

Furthermore, since nickel has a catalytic function to generate protons from hydrogen gas, it can be made to function as a catalyst that complements the proton generation function of the fuel electrode. However, when the content of tin is more than 30% by mass, it is not possible to expect the catalytic function to generate protons.

The Ni—Sn alloy functions as a catalyst to decompose hydrogen gas to generate protons by means of the Ni component. However, the Ni—Sn alloy functions insufficiently as a fuel gas reforming catalyst to process the carbon component contained in a fuel gas, and carbon is likely to be precipitated. In this embodiment, a first catalyst capable of processing a carbon component contained in a fuel gas is supported on a surface of the alloy layer, the surface facing pores of the porous metal body.

By allowing the first catalyst to be supported on the surface of the alloy layer, it is possible to efficiently process the carbon component contained in the fuel gas flowing through the pores and to convert the carbon component into water and carbon dioxide, thus efficiently preventing precipitation of carbon on the fuel electrode. Furthermore, by effectively using the heat generated in the fuel cell, the carbon component in the fuel gas can be processed. Therefore, the durability of the fuel cell can be increased, and it is not necessary to provide a fuel gas reformer outside the fuel cell. Consequently, the apparatus does not become complicated or the scale of the apparatus does not increase.

Furthermore, the first catalyst may be supported, in a state in which the particle shape is retained, on the surface of the alloy layer facing the pores such that the gas reforming function can be exhibited (the first catalyst may have a particulate shape). When the first catalyst is in the shape of fine particles that can be held in the pores, the surface area of the first catalyst can be increased, and the fuel gas reforming function can be enhanced. The first catalyst is preferably supported such that the surfaces of the pores of the porous metal body are not completely covered. In such a manner, the fuel gas is brought into contact with the surface of the porous metal body so that the proton generation function of the Ni component contained therein can be exhibited. In this embodiment, the first catalyst has a particulate shape (relatively close to spherical, equiaxial shape), but may have another shape (e.g., plate-like shape, acicular shape, or the like).

As the first catalyst, a catalyst composed of one or two or more components containing silver (Ag) or platinum (Pt) can be used. By using such a catalyst, the carbon component contained in the fuel gas can be processed, and it is possible to prevent precipitation of carbon on the fuel electrode.

Preferably, the first catalyst is supported in the amount of 1% to 15% by mass in the porous current collector. When the amount of the first catalyst supported is 1% to 15% by mass, the surface area of the catalyst can be increased without impairing the fuel gas permeability, which is preferable.

In particular, silver (Ag) is a relatively inexpensive catalyst, but does not normally form a solid solution with Ni. Therefore, it is difficult to allow silver to be stably supported on a porous metal body made of Ni. In this embodiment, at least the surface of the porous metal body is made of a nickel-tin alloy, silver particles can be stably supported on the surface of the alloy layer facing the pores.

More particularly, silver (Ag) and platinum (Pt) can be each dissolved in tin. Accordingly, in the case where the first catalyst is composed of one or two or more components containing silver (Ag) or platinum (Pt), part of silver (Ag) or platinum (Pt) constituting the first catalyst is dissolved in "the porous metal body having an alloy layer at least on a surface thereof, the alloy layer containing nickel (Ni) and tin (Sn)", the bond strength between the first catalyst and the porous metal body increases, and it is possible to prevent the first catalyst from falling off from the porous metal body.

Furthermore, in order to enhance the performance of the fuel cell, preferably, a second catalyst selected from nickel (Ni), a nickel (Ni)-tin (Sn) alloy, and a nickel (Ni)-tin (Sn)-chromium (Cr) alloy is supported on the surface of the alloy layer facing the pores in the porous current collector.

By providing a nickel-tin alloy layer on the surface, corrosion of the porous current collector can be effectively prevented. On the other hand, by mixing tin, the proton generation function of the nickel component is decreased. In this embodiment, the second catalyst having a high proton generation function is supported on the surface of the alloy layer facing the pores of the porous metal body in the same manner as that of the first catalyst. Since the second catalyst is supported, the proton generation function in the fuel electrode is improved, and the performance of the fuel cell can be enhanced.

As the second catalyst, preferably, nickel (Ni) or a nickel (Ni)-tin (Sn) alloy in which the content of nickel is increased in order to enhance the catalytic function is used. The second catalyst composed of such a material is more likely to be corroded than the porous metal body. However, the corrosive environment is harshest in the vicinity of the surface of the fuel electrode, and the corrosive environment in a region distant from the fuel electrode is not as harsh as that in the vicinity of the fuel electrode. Therefore, even though the function of the second catalyst supported in the vicinity of the fuel electrode is decreased early, the proton generation function of the current collector as a whole is increased and maintained for a long period of time. Consequently, the performance and durability of the fuel cell can be enhanced. Furthermore, the second catalyst may be arranged so as to be supported in a region distant from the fuel electrode.

In this embodiment, the second catalyst has a particulate shape (relatively close to spherical, equiaxial shape), but may have another shape (e.g., plate-like shape, acicular shape, or the like).

The porous metal body to be used preferably has a porosity of 50% to 98%, and more preferably 80% to 90%. When the porosity is less than 50%, fuel gas flowability decreases, and it is not possible to feed the fuel gas sufficiently to the fuel electrode. Furthermore, it is difficult to support a sufficient amount of the catalyst. On the other hand, when the porosity is more than 98%, it is not possible to secure the strength of the current collector and electrical conductivity.

The catalyst to be used preferably has an average particle size of 0.05 to 5 μm. When the particle size is more than 5 μm, it is difficult to allow the catalyst in the form of particles to be supported on the surface of the alloy layer facing the pores of the porous metal body. Furthermore, it is not possible to increase the surface area of the catalyst.

The porous metal body to be used may have various forms. For example, a sheet-like porous metal body obtained by knitting or entangling metal fibers can be used.

The method for producing the porous metal body is not particularly limited. For example, the porous metal body can be produced by providing a Ni—Sn alloy layer on the surface of a porous substrate made of an electrically conductive metal or ceramic. The method for forming the Ni—Sn alloy layer is not particularly limited. For example, the Ni—Sn alloy layer can be provided by forming a coating layer containing Ni powder and Sn powder or applying Ni—Sn alloy powder by coating on the surface of the porous substrate, followed by firing. Furthermore, the Ni—Sn alloy layer can be formed by stacking a Sn layer on a Ni layer, followed by heating to diffuse and alloy the Ni layer and the Sn layer. Furthermore, the Ni—Sn alloy layer can be formed by using a porous substrate made of a Ni—Cr alloy, and stacking a Sn layer on the surface thereof, followed by heating to diffuse the Ni layer and the Sn layer.

A Ni oxide film has oxygen permeability and low electrical conductivity. Consequently, when the Ni oxide film covers the surface of the current collector, there is a concern that not only the function of the current collector may be decreased, but also durability may be decreased. In order to avoid this, the content of the Sn component can be increased at least on the surface side.

The porous metal body to be used preferably has a three-dimensional network structure.

Furthermore, preferably, the three-dimensional network structure of the porous metal body has a skeleton including a shell portion containing nickel (Ni) and tin (Sn) at least on a surface thereof and a core portion containing one or both of a hollow and an electrically conductive material, and the skeleton is continuous in an integrated manner.

In the porous metal body, since the skeleton has a three-dimensional network structure, the porosity can be set to be very high. Thereby, the flow resistance of gas in pores decreases, a large amount of gas can be made to flow and act on the electrode, and current collection can be performed efficiently. Furthermore, the skeleton is formed so as to be continuous in an integrated manner. Therefore, it is possible to secure a high strength even in a high-temperature usage environment.

The method for producing the porous metal body is not particularly limited. For example, a porous current collector can be produced by forming a Ni—Sn alloy layer by a plating process or the like on the surface of a porous metal body having heat resistance at the usage temperature. The form of the porous metal body is not particularly limited.

Furthermore, the porous metal body can be produced by a method including a Ni plating layer-forming step in which a Ni plating layer is formed on a porous substrate made of a resin foam or the like, a Sn plating layer-forming step in which a Sn plating layer is formed on the Ni plating layer, a substrate removal step in which the porous substrate is removed in an atmosphere containing at least oxygen, and a diffusion step in which the Ni plating layer and the Sn plating layer are diffused in a reducing atmosphere under the temperature of 300° C. to 1,100° C.

By the method described above, the necessary amount or more of the Sn component can be provided on the surface of the porous current collector that is exposed to a high-temperature, oxidizing atmosphere. A Sn oxide layer is formed on the surface of the porous current collector in a high-temperature usage environment. Therefore, it is possible to secure the function of the current collector for a long period of time.

The porous current collector according to the embodiment can be used for various types of fuel cell. In particular, the porous current collector can be used as a current collector of a fuel electrode in an SOFC that operates at high temperatures.

DETAILED DESCRIPTION OF EMBODIMENTS

An embodiment of the present invention will be described in detail with reference to the drawings. In this embodiment, a three-dimensional network structure is applied to a porous current collector. However, the porous current collector is not limited to the form described below, and porous current collectors having various forms can be used.

FIG. 1 schematically shows a cell structure of a solid oxide fuel cell. Although FIG. 1 shows one cell structure, in order to increase the electricity generation voltage, a plurality of cells are stacked in the thickness direction, thus constituting a fuel cell.

A fuel cell 101 includes a membrane electrode assembly 5 in which a first electrode layer 3 serving as an air electrode and a second electrode layer 4 serving as a fuel electrode are stacked so as to sandwich a solid electrolyte layer 2. A solid electrolyte constituting the solid electrolyte layer 2 is not particularly limited, and can be formed using a ceramic material having oxygen ion conductivity or proton conductivity. For example, as the solid electrolyte material having oxygen ion conductivity, yttrium-stabilized zirconia (YSZ), scandium-stabilized zirconia (SSZ), or the like may be used. Furthermore, as the solid electrolyte material having proton conductivity, barium zirconate or the like may be used. In this embodiment, description will be made on a fuel cell including a solid electrolyte layer having proton conductivity.

Materials constituting the air electrode 3 and the fuel electrode 4 are not particularly limited, and can be selected according to the material of the solid electrolyte and the like. For example, the electrodes can be made of a metal, such as nickel or lanthanum, or a fired body of nickel oxide or the like. In this embodiment, the fuel electrode is made of a mixture of nickel and barium zirconate.

A first current-collecting member 6 is disposed outside the membrane electrode assembly 5 (MEA) with a'first porous current collector 8 therebetween, and a second current-collecting member 7 is disposed outside the membrane electrode assembly 5 (MEA) with a second porous current collector 9 therebetween. The current-collecting members 6 and 7 are each made of a metal plate or carbon plate having electrical conductivity, and by forming a channel or the like in the inner surface thereof, each of a first gas flow path 13 and a second gas flow path 14 through which gas flows is provided.

The porous current collectors 8 and 9 are each made of a porous body having electrical conductivity, and are configured to diffuse the gases that flow through the gas flow paths 13 and 14 into the electrode layers 3 and 4, respectively, so that the gases can act and to electrically connect the electrode layers 3 and 4 to the current-collecting members 6 and 7, respectively, to achieve conduction.

The porous current collectors 8 and 9 and the current-collecting members 6 and 7 are disposed on both sides of the membrane electrode assembly 5, and peripheral portions where the solid electrolyte layer 2 is not provided are sealed with gaskets 15 and 16, thus constituting the fuel cell 101.

Air containing oxygen serving as an oxidant is introduced into the first gas flow path 13, and oxygen is fed to the first electrode layer 3 through the first porous current collector 8. A fuel gas containing hydrogen serving as a fuel is introduced into the second gas flow path 14, and hydrogen is fed to the second electrode layer 4 through the second porous current collector 9.

In the second electrode layer 4, the reaction $H_2 \rightarrow 2H^+ + 2e^-$ takes place. Furthermore, in the first electrode layer 3, the reaction $\frac{1}{2}O_2 + 2H^+ + 2e^- \rightarrow H_2O$ takes place. As a result, hydrogen ions move from the second electrode layer 4 through the solid electrolyte layer 2 to the first electrode layer 3, and electrons flow from the second electrode layer 4 through the second porous current collector 9, the second current-collecting member 7, the first current-collecting member 6, and the first porous current collector 8 to the first electrode layer 3. Thus, electricity is generated. Note that the fuel cell 101 is heated to a predetermined temperature by a heating device (not shown).

In FIG. 1, in order to facilitate understanding, the thickness of each of the first electrode layer 3 and the second electrode layer 4 is depicted larger than the actual one. Furthermore, although each of the first gas flow path 13 and the second gas flow path 14 is depicted as a continuous large space, a channel or the like with a predetermined width is formed in the inner surface of each of the current-collecting members 6 and 7.

In this embodiment, as the second porous current collector 9, a porous metal body containing a nickel (Ni)-tin (Sn) alloy is used. Furthermore, a first catalyst 20 capable of processing a carbon component contained in a fuel and a second catalyst 21 capable of generating protons are supported on the second porous current collector 9.

Figure 2:
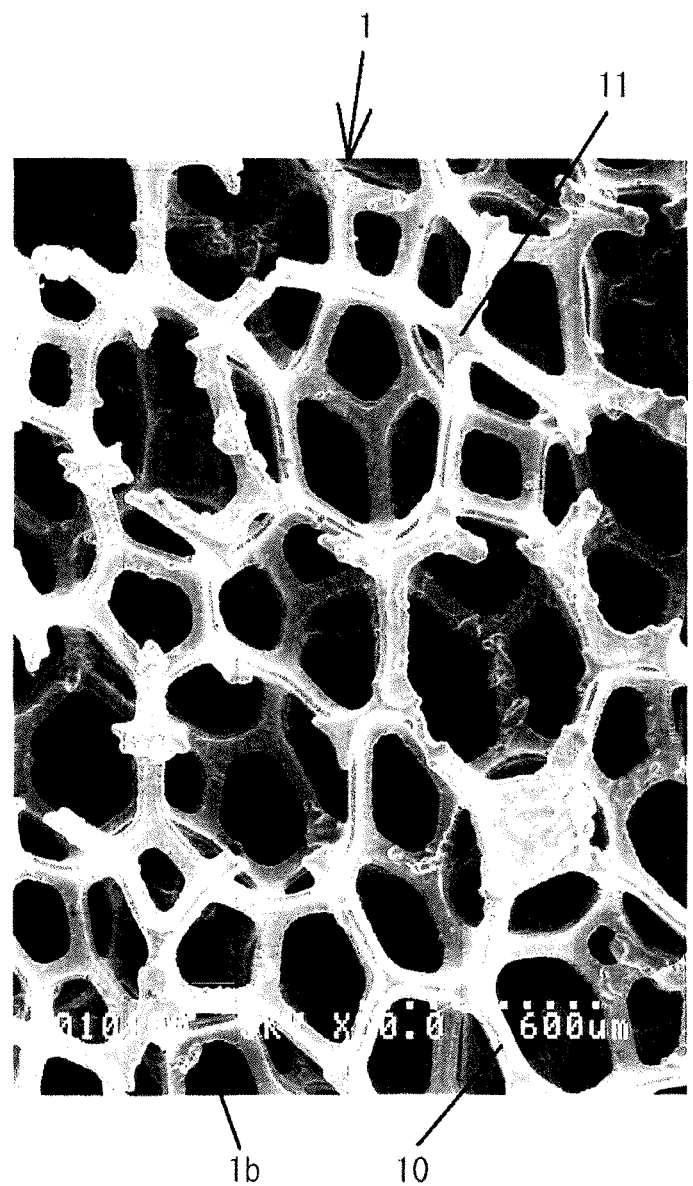
FIG. 2 is a micrograph showing an example of a porous metal body.
Figure 3:
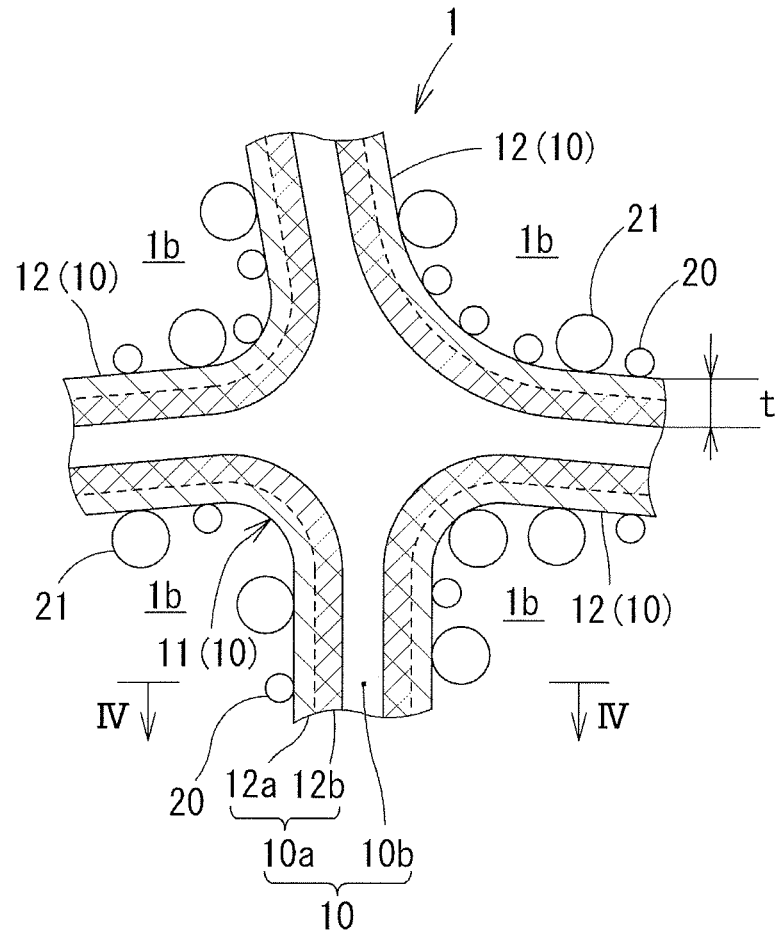
FIG. 3 is a view schematically showing a state in which catalyst particles are supported on the surface of an alloy layer facing pores of the porous metal body shown in FIG. 2.
Figure 4:
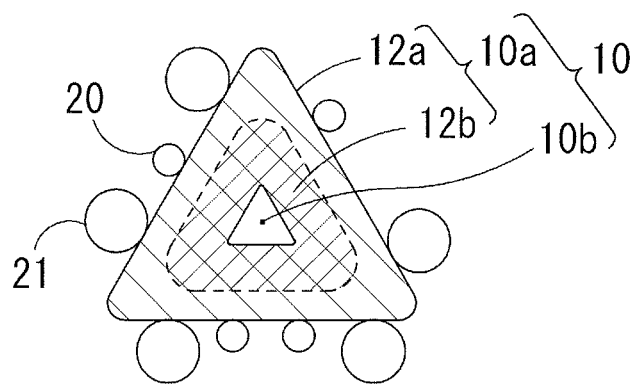
FIG. 4 is a cross-sectional view taken along the line IV-IV of FIG. 3.

FIG. 2 is an electron micrograph showing an external structure of a porous metal body 1 constituting each of the porous current collectors 8 and 9. The porous metal body 1 has a three-dimensional network structure including continuous pores 1b. As shown in FIGS. 2 to 4, the three-dimensional network structure has a form in which a triangular prism-shaped skeleton 10 three-dimensionally, continuously extends, and a plurality of branch portions 12 constituting the skeleton 10 meet at node portions 11 and continuously extend in an integrated manner. Furthermore, as shown in FIG. 4, each portion of the skeleton 10 includes a shell portion 10*a* and a hollow core portion 10*b*. As will be described later, the shell portion 10*a* has an alloy layer 12*a* on the surface thereof, the alloy layer 12*a* being made of nickel (Ni)-tin (Sn) in which nickel (Ni) and tin (Sn) are alloyed integrally.

The porous metal body 1 has a porous form including continuous pores 1*b*. Therefore, a fuel gas or the like can be made to flow through the continuous pores 1*b* so as to act on each electrode, and efficient current collection can be achieved. Moreover, since the porous metal body 1 has the three-dimensional network structure, the porosity can be set to be very high. Thereby, the flow resistance of gas in pores decreases, a large amount of gas can be made to flow, and electricity generation efficiency can be enhanced.

As shown in FIG. 3, the thickness t of the shell portion 10*a* is substantially constant for a node portion 11 and the branch portions 12 which meet at the node portion 11 in the three-dimensional network structure. Therefore, the entire porous body has uniform mechanical strength. Accordingly, even when applied to a current collector of a SOFC that is used in a high-temperature environment, required strength can be secured.

For example, as the porous metal body, it is preferable to use one which has a porosity of 50% to 98% and in which the amount of change in the thickness is less than 30% when, after being heated to 600° C. or higher in the air, applied with a load of 30 Kgf/cm$^2$ at normal temperature.

The porous metal body 1 according to this embodiment includes an alloy layer 12*a* made of an alloy containing Ni (nickel) and Sn (tin) (hereinafter referred to as a "Ni—Sn alloy"). The contents of Ni and Sn in the alloy layer 12*a* can be set in accordance with the operating temperature and the like. For example, preferably, the alloy layer 12*a* contains at least 5% to 30% by mass of Sn. More preferably, the alloy layer 12*a* contains 10% to 25% by mass of Sn.

Furthermore, in addition to the Ni component, and the Sn component, 10% by mass or less of a phosphorus component is preferably added into the alloy layer. In order to add the phosphorus component, an additive containing phosphorus may be added during formation of a Ni—Sn alloy layer. For example, after a Ni layer is formed by electroless nickel plating, by using a hypophosphorous acid-based material as a reducing agent, the phosphorus component can be added. Thereby, electrolytic resistance and corrosion resistance are further improved. As the phosphorus content increases, heat resistance decreases. Therefore, the phosphorus content is set at 10% or less.

The porous metal body 1 can be produced using various methods. For example, a surface of a porous substrate is directly coated with a Ni—Sn alloy material constituting a porous metal body, followed by firing, to form the Ni—Sn alloy layer.

Furthermore, the porous metal body can be produced by a method including a step in which a porous resin substrate having a three-dimensional network is subjected to electrical conduction treatment to form a surface conductive layer, a Ni plating layer-forming step in which a Ni plating layer is formed on the conductive layer, a Sn plating layer-forming step in which a Sn plating layer is formed on the Ni plating layer, a substrate removal step in which the porous resin substrate is removed in an atmosphere containing at least oxygen, and a diffusion step in which the Ni plating layer and the Sn plating layer are diffused and alloyed in a reducing atmosphere under the temperature of 300° C. to 1,100° C. Note that the substrate removal step may be conducted after the Ni plating layer-forming step, a step of reducing the Ni plating layer oxidized in the substrate removal step may be conducted, and then the Sn plating layer-forming step and the diffusion step may be conducted.

The form of the three-dimensional network resin may be a resin foam, a nonwoven fabric, a felt, a woven fabric, or the like. The material that constitutes the three-dimensional network resin is not particularly limited, but is preferably a material that can be removed by heating or the like after being plated with metal or the like. Furthermore, in order to secure workability and handleability, it is preferable to use a material having flexibility. In particular, use of a resin foam as the three-dimensional network resin is preferable. A known resin foam can be used as long as it is porous with continuous pores. For example, a urethane foam, a styrene foam, or the like may be used. The form of pores, porosity, and dimensions of the resin foam are not particularly limited and can be appropriately set in accordance with the intended use.

In the case where the porous metal body 1 is formed by plating treatment, the step of forming the surface conductive layer is conducted in order to reliably form the Ni plating layer on the surface of each pore of the three-dimensional network resin. As long as a surface conductive layer required for Ni plating treatment can be provided, the formation method is not particularly limited. For example, in order to form a surface conductive layer composed of Ni, electroless plating treatment, sputtering treatment, or the like may be employed.

The method for forming each of the Ni plating layer 12*b* and the Sn plating layer is not particularly limited, and a known plating method such as an aqueous solution plating method may be employed.

The total thickness (metal plating weight) of the Ni—Sn alloy plating layer is not particularly limited, and can be set in consideration of the required porosity and strength. For example, the metal plating weight may be 100 to 2,000 g/m$^2$.

The thickness of each of the Ni plating layer 12*b* and the Sn plating layer is set in accordance with the composition ratio of Ni to Sn. For example, when the composition ratio of Ni to Sn is 8:2, the thickness (metal plating weight) of the individual plating layers can be set to be 800 g/m$^2$(Ni):200 g/m$^2$(Sn).

After the Ni plating layer 12*b* and the Sn plating layer are formed, or after the Ni plating layer 12*b* is formed, a substrate removal step in which the three-dimensional network resin is removed is conducted. In the substrate removal step, for example, by heat-treating the porous body provided with the plating layer at a predetermined temperature, in a stainless steel muffle, in an oxidizing atmosphere such as air, the three-dimensional network resin can be removed by burning.

As shown in FIGS. 3 and 4, the core portion 10*b* of the porous metal body 1 according to this embodiment is hollow, although not limited thereto. That is, in the embodiment described above, the surface conductive layer composed of Ni (not shown) and the Ni plating layer 12*b* and the Sn plating layer formed thereon are diffused to each other and integrated into the alloy layer 12*a*. However, in the case where the surface conductive layer is composed of another electrically conductive material, it may remain as a core portion in some cases.

By heat-treating the porous body on which the Sn plating layer and the Ni plating layer are formed, in a stainless steel muffle, in a reducing gas atmosphere, such as CO or H$_2$, at 300° C. to 1,100° C., the Ni plating layer 12b and the Sn plating layer are diffused to each other to form a shell portion 10a including the Ni—Sn alloy layer 12a. The thickness of the alloy layer 12a is preferably set at 5 μm or more.

By employing the steps described above, it is possible to form each of the porous current collectors 8 and 9 in which the variation in the Sn concentration in the shell portion 10a is low, and the oxidation resistance at high temperatures is high. Furthermore, since the shell portion is formed of the plating layer, the thickness (cross-sectional area) of the shell portion can be set to be substantially uniform in the porous body. Therefore, the variation in the mechanical strength in the porous body decreases, and it is possible to produce a porous current collector having uniform strength. Accordingly, even when used as a current collector of a SOFC that requires heat resistance and mechanical strength, it is possible to secure durability.

In this embodiment, as shown in FIGS. 3 and 4, the porous current collector 9 provided adjacent to the fuel electrode 4 includes the porous metal body 1, and the first catalyst 20 capable of processing a carbon component contained in a fuel gas is supported on the porous metal body 1. The first catalyst 20 in the form of particles is supported on the surface of the alloy layer 12a facing the continuous pores 1b of the porous metal body 1.

Since the surface of the porous metal body 1 includes the alloy layer 12a made of a nickel-tin alloy, when silver (Ag) is used as the first catalyst, this can be reliably supported on the surface of the alloy layer 12a.

Furthermore, since the first catalyst 20, while being maintained in the particle form, is supported on the surface of the alloy layer 12a facing the continuous pores 1b, the surface area of silver serving as a catalyst can be increased.

The first catalyst in the particle form can be supported on the surface of the skeleton of the porous metal body 1 by preparing a slurry by adding an organic solvent and a diluent to the catalyst powder 20 in the particle form, and immersing the porous metal body 1 in the slurry, followed by drying and firing.

When methane gas ($CH_4$) serving as a fuel gas, together with water vapor, is fed to the second porous current collector 9 on which the first catalyst 20 is supported, the methane gas is decomposed into hydrogen and carbon monoxide by the first catalyst 20, and the carbon monoxide is further decomposed into hydrogen and carbon dioxide. Therefore, the carbon component in the methane gas is not precipitated on the fuel electrode, and the durability of the fuel electrode is enhanced. Furthermore, there is no need to provide a reformer that processes the carbon component outside the fuel cell, and the apparatus does not become complicated or the scale of the apparatus does not increase.

Moreover, the heat generated in the fuel cell 101 can be used for decomposition of the methane gas. The waste heat generated in the fuel cell is also absorbed, and therefore, it is possible to increase the energy efficiency of the system.

Furthermore, in this embodiment, in addition to the first catalyst 20, the second catalyst 21 capable of decomposing hydrogen gas into protons is supported on the surface of the alloy layer 12a facing the continuous pores 1b of the porous metal body 1.

The second catalyst 21 in the form of particles is supported on the alloy layer facing the continuous pores in the same manner as that of the first catalyst. As the second catalyst 21 according to this embodiment, nickel particles are used. Nickel particles are highly capable of generating protons from hydrogen gas. Therefore, by allowing the second catalyst 21 to be held on the porous metal body 1, the proton generation function of the second electrode layer (fuel electrode) can be complemented, and the performance of the fuel cell can be enhanced.

The second catalyst in the particle form can be supported on the surface of the skeleton of the porous metal body 1 by preparing a slurry by adding an organic solvent and a diluent to the catalyst powder 21 in the particle form, and immersing the porous metal body 1 in the slurry, followed by drying and firing, in the same manner as that of the first catalyst.

The second catalyst 21 composed of Ni is more likely to be corroded than the porous metal body 1. However, the corrosive environment is harshest in the vicinity of the surface of the fuel electrode 4, and the corrosive environment in a region distant from the fuel electrode 4 is not as harsh as that in the vicinity of the fuel electrode. Therefore, even though the function of the second catalyst 21 supported in the vicinity of the fuel electrode is decreased early, the proton generation function of the current collector as a whole is increased and maintained for a long period of time. Consequently, the performance and durability of the fuel cell can be enhanced. Furthermore, the second catalyst may be arranged so as to be supported in a region distant from the fuel electrode.

The scope of the present invention is not limited to the embodiment described above. It should be considered that the embodiment disclosed this time is illustrative and non-restrictive in all aspects. The scope of the present invention is defined not by the foregoing description but by the appended claims, and is intended to include all modifications within the meaning and scope equivalent to those of the claims.

INDUSTRIAL APPLICABILITY

It is possible to provide a porous current collector having a high gas reforming function and high durability.

REFERENCE SIGNS LIST 1 porous metal body
1b pore (continuous pore)
2 solid electrolyte layer
3 air electrode
4 fuel electrode
5 membrane electrode assembly
6 first current-collecting member
7 second current-collecting member
8 first porous current collector (air electrode side)
9 second porous current collector (fuel electrode side)
10 skeleton
10a shell portion
10b core portion
12a alloy layer
12b nickel plating layer
13 first gas flow path
14 second gas flow path
15 gasket
16 gasket
20 first catalyst
21 second catalyst
101 fuel cell

The invention claimed is:

1. A porous current collector, which is provided adjacent to a fuel electrode of a fuel cell that includes a solid electrolyte layer, the fuel electrode disposed on one side of the solid electrolyte layer, and an air electrode disposed on the other side, comprising a porous metal body and a first catalyst, wherein the porous metal body has an alloy layer at least on a surface thereof, the alloy layer containing nickel (Ni) and tin (Sn), the first catalyst is supported on a surface of the alloy layer, the surface facing pores of the porous metal body, and is capable of processing a carbon component contained in a fuel gas that flows inside the pores, the first catalyst comprises at least one component selected from silver (Ag) or platinum (Pt), a second catalyst selected from a nickel-tin alloy or a nickel-tin-chromium (Cr) alloy is supported on the surface of the alloy layer facing the pores of the porous metal body, and the first catalyst is partially dissolved in the alloy layer.

2. The porous current collector according to claim 1, wherein the first catalyst is supported in the amount of 1% to 15% by mass of the total mass of the porous current collector.

3. The porous current collector according to claim 1, wherein the content of tin (Sn) in the alloy layer is 5% to 30% by mass.

4. The porous current collector according to claim 1, wherein the porous metal body has a porosity of 50% to 98%.

5. The porous current collector according to claim 1, wherein the catalyst has an average particle size of 0.05 μm to 5 μm.

6. The porous current collector according to claim 1, wherein the porous metal body has a three-dimensional network structure.

7. The porous current collector according to claim 6, wherein the three-dimensional network structure has a skeleton including a shell portion including the alloy layer containing nickel (Ni) and tin (Sn) at least on a surface thereof and a core portion containing one or both of a hollow and an electrically conductive material, and the skeleton is continuous in an integrated manner.

8. The fuel cell according to claim 1, wherein the fuel cell comprises the porous current collector.

* * * * *